April 1, 1952     C. CORNELIUS     2,590,942
COOKING STOVE
Filed Sept. 13, 1948
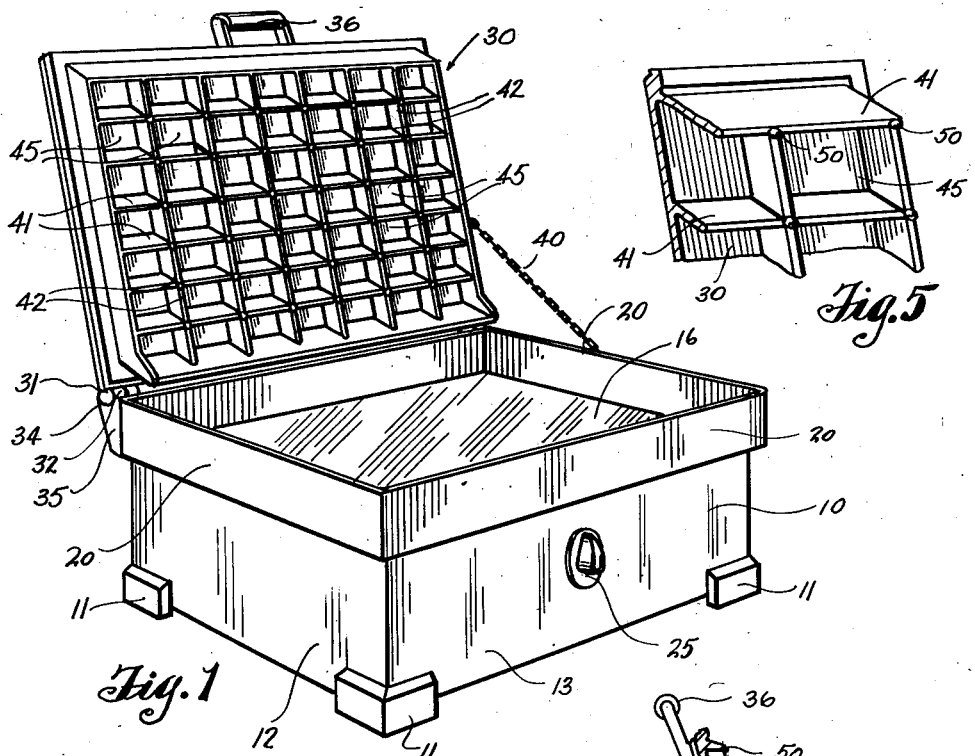
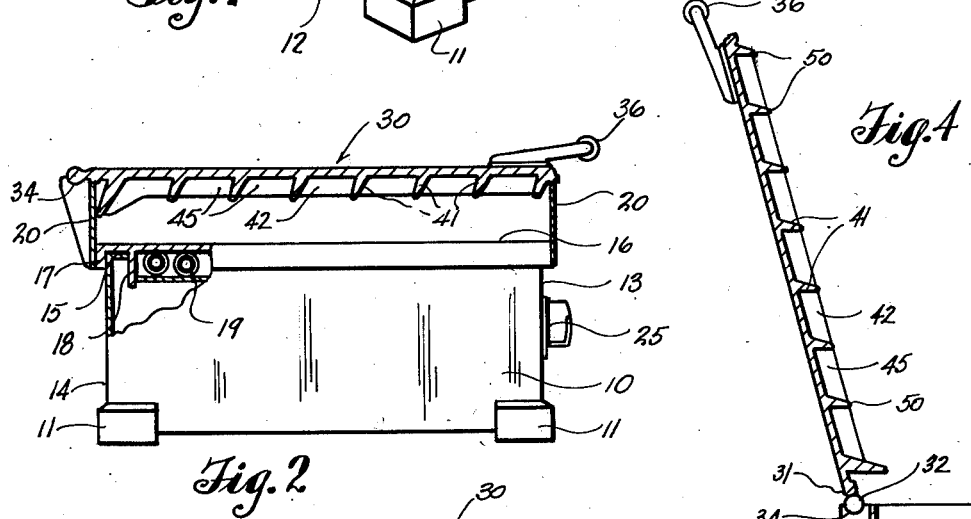
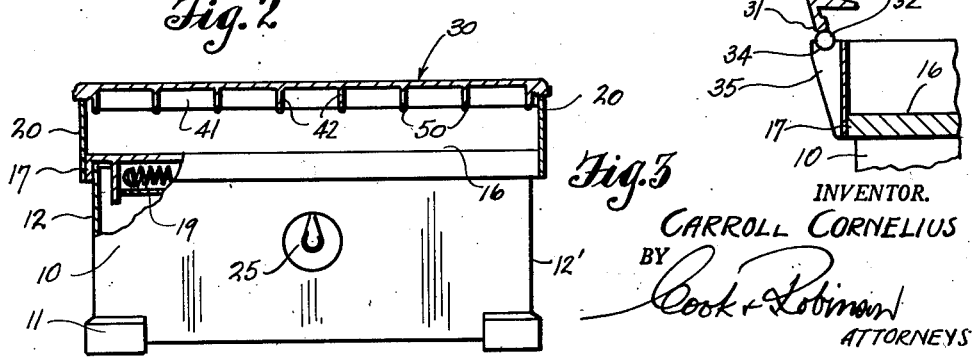
INVENTOR.
CARROLL CORNELIUS
BY
ATTORNEYS Patented Apr. 1, 1952

2,590,942

UNITED STATES PATENT OFFICE 2,590,942

COOKING STOVE

Carroll Cornelius, Seattle, Wash.

Application September 13, 1948, Serial No. 49,010

1 Claim. (Cl. 99—347)

This invention relates to cooking stoves and has reference more particularly to improvements in stoves of that kind, or type, disclosed in United States Patent 2,015,856, issued on October 1, 1935, to Anthony L. Lang; it being the principal object of the invention to provide an improvement in such stoves that adapts them especially for the frying of meats, and particularly for the frying of chicken. Furthermore, to provide such improved stoves that are suited for home use as well as for use in the kitchens of public service places such as restaurants, hotels and the like.

More specifically stated, the objects of the present invention reside in the provision of a stove having a flat top plate, on which the meat or the like to be fried is placed, and which top plate is equipped about its peripheral edges with upstanding walls or flanges to provide a shallow container or, in effect, a fry-pan, and to which pan a cover or lid of a novel kind is hingedly attached so that it may be swung vertically between closed and opened positions, and which, on its under side, is equipped with means which provides for the self-basting of the meat as it is fried.

Another object of the invention is to provide a fry-pan lid with a novel arrangement of crossed ribs or flanges on its under side which, during the frying of meats in the pan, causes vapors to be collected and to be formed into droplets, and to release these droplets, to baste the meat as it is cooked.

Still further objects of the invention reside in the details of construction of the cover or lid and its combination and relationship with the other parts of the stove as will hereinafter be fully described.

In accomplishing these and other objects of the invention, I have provided the improved details of construction, the preferred forms of which are illustrated in the accompanying drawings, wherein—

Fig. 1 is a perspective view of a stove in which the improvements of the present invention have been embodied; the cover, or lid, of the fry-pan being shown in opened position.

Fig. 2 is a side view of the stove with parts thereof broken away and in vertical section for better understanding, and showing the lid or cover in closed position.

Fig. 3 is a similar front view of the stove, showing the lid or cover in closed position.

Fig. 4 is a vertical, sectional view of the lid, or cover, in its opened position, and illustrating the sloping of the horizontal ribs on the under side of the lid for draining the grease therefrom into the fry pan.

Fig. 5 is a perspective view of a corner portion of the lid, showing the crossing of ribs on its under side and the drip points on the ribs.

Referring more in detail to the drawings—

The stove, as herein shown, comprises a rectangular, box-like body frame 10, equipped at its four lower corners with leg forming portions 11. The rectangular frame comprises vertical opposite side walls 12—12' and front and back walls 13—14, each of which walls is provided along its top edge with an inturned flange 15, as shown best in Fig. 2; all flanges being in the same horizontal plane.

Seated upon the housing and resting on the flanges 15 of the side and end walls, is the top plate 16. This is formed with depending flanges 17 about its peripheral edges which closely receive the flanged top edges of the walls of the housing therein. Formed on the under side of the plate 16, and spaced inwardly from the outer flanges 17 and parallel therewith, are flanges 18 of greater depth, and confined within the area defined by these latter flanges are electrical heating elements, as designated at 19 in Fig. 1. These are supported closely adjacent the under side of the plate 16 for heating it. Preferably, heating elements as described in the above mentioned patent to Lang would be employed. However, any suitable kind of type of heating element or means could be employed.

Fixed to the peripheral edge flanges 17 of the top plate 16 and extending entirely about the plate, are strips or plates of metal providing upstanding walls 20 which, together with the plate 16, form a shallow fry-pan in which the cooking of meats, and the like, may be accomplished. For the frying of chicken, the walls 20 would be about two and one-half to three inches high. The plate 16 preferably would be about eighteen inches square, and stoves embodying one or more of the units as above described could be employed as is now anticipated for use in restaurants and public service eating places. It is desirable, or most practical that when so used, each top plate or unit should have an individual heating means and a control therefor so that one or more might be used, as required or desired.

When the individual units are electrically heated, each would have an individual control switch for its current as designated at 25. Likewise, if stoves are gas heated, each would have an individual heat control means.

Hinged to the vertical flange or wall 20 that extends along the back side of the fry-pan, is a lid, or cover, 30 with improvements embodied by this invention. This lid is provided at the hinged edge, near its corners, with extending legs or lugs 31, formed with rounded end portions 32 that are pivotally seated in upwardly opening sockets 34 formed in the top surfaces of lugs 35 fixed on the rear wall as noted in Figs. 2 and 4. At its outer edge, the lid is equipped with a handle 36 which may be of any suitable kind, suitable for opening or closing the lid. When the lid is opened, it is slightly rearwardly inclined and is supported there, as seen in Figs. 1 and 4, by a chain, or cord, as at 40, or by other suitable means. When in closed position, the plate 16 fits against the top edges of the pan walls 20 in a close, steam-tight joint as shown in Figs. 2 and 3.

Formed on the under side of the lid or cover is a succession of evenly spaced cross-ribs 41, and also there is a like succession of evenly spaced ribs 42 at right angles to the direction of ribs 41, the two sets of ribs, 41 and 42, together forming successive rows of rectangular pockets or compartments 45, as shown best in Fig. 1. The ribs are so spaced and are of such depth that they provide, over the under side of plate 16, pockets about one inch deep, and about 2¼ to 2½ inches in width and length. When the cover is closed over the pan, the pockets all open downwardly as understood by reference to Figs. 2 and 3.

At each of the points of intersection of the crossed ribs, there is provided a small depending protuberance 50, shown best in Fig. 5. These are directed downwardly when the lid is closed, and provide drip points for condensed or collected liquid vapors. These, being spaced apart and over the entire under area of the lid, provide for even and effective self-basting of cooking meats.

Another feature of the invention resides in the fact that the cross ribs 41, which extend horizontally when the lid is in opened position, are downwardly inclined, as has been shown in Fig. 4, and the shape is such that each will drain the grease or liquid that collects thereon before it cools and solidifies, onto the next lower rib. The lowermost cross rib of the series is of such exterior width or depth that it will substantially overhang the rear wall of the pan when the lid is opened and no grease will be drained therefrom to the outside of the pan. This has been illustrated in Fig. 4.

While I have shown the stove to be square or rectangular in form, it is to be understood that it can be, and it is anticipated that such stoves shall be, made in oval, round or rectangular form, and that they be made in various sizes and in various numbers of units, as may be required or desired for any particular use.

The lid or cover of the fry-pan may be used also on fry pans, kettles, pots or ovens of other kinds and serve in the same capacity for the self-basting of the food being cooked. The feature of this lid is the formation of pockets by the crossed ribs; the provision of the drip points at the points of intersection of ribs, and the inclining of the cross ribs for drainage purposes.

It is not intended to restrict use of the present cover to stoves of any specific form or kind, nor that the fry pan with cover of the kind shown be limited to any specific shape or size of stove.

To use the present type of stove for chicken frying, the chicken is placed in the pan, as for frying in the usual way. The lid or cover is then closed and the chicken fried for about fifteen minutes. Then the lid is raised and the pieces are turned over. Then the lid is again closed and the chicken allowed to fry for about ten to fifteen minutes more. Heat is then turned off and lid raised to open position.

During cooking, the steam, grease or vapors arising from the meat will be trapped in the pockets 45 and condensed on the ribs. It is then caused to drop from the protuberances 50 onto the meat. In this way, the meat will be kept well basted at all times. No vapors, flavors or odors escape from the pan during cooking.

When the lid is raised, all grease will quickly drain from the pockets of the cover, into the pan before having time to solidify in the pockets.

While I have described this stove as being especially designed for the frying of chicken, it is to be understood that it has other practical uses; for example, with the lid in the raised position, the top plate can be used for the cooking of hotcakes or the like. Also, the device can be used for the warming or baking of buns.

Having thus described my invention, what I claim as new therein and desire to secure by Letters Patent is:

In a stove for frying meats having a flat top plate providing a frying surface, and enclosing walls extending upwardly from the periphery thereof to provide a pan-like container of substantial depth; a flat lid hinged at one edge to the container, to close tightly thereover and adapted to be lifted to a substantially upright open position; said cover having a plurality of thin flat ribs formed across its under surface, in spaced relationship and parallel with the hinge axis of the lid, and having other ribs crossed therewith and dividing the ribbed area of the lid into a plurality of individual pockets for the collection and condensation of cooking vapors therein, and from which ribs the condensed vapors will be caused to drip when the lid is closed; those ribs which are parallel with the hinge axis being inclined relative to the lid to slope downwardly and away from the lid to cause the draining of condensed vapors therefrom and their return into the container when the lid is supported in its open position.

CARROLL CORNELIUS.

REFERENCES CITED

The following references are of record in the file of this patent:

UNITED STATES PATENTS

| Number | Name | Date |
| --- | --- | --- |
| 246,194 | Patton | Aug. 23, 1881 |
| 426,712 | Carpenter | Apr. 29, 1890 |
| 427,671 | Carpenter | May 13, 1890 |
| 498,569 | Peterson | May 30, 1893 |
| 991,162 | McLaughlin | May 2, 1911 |
| 1,249,023 | Busse | Dec. 4, 1917 |
| 1,275,611 | Schwab | Aug. 13, 1918 |
| 1,330,209 | Massing | Feb. 10, 1920 |
| 1,336,734 | De Graff | Apr. 13, 1920 |
| 1,409,262 | Wagner | Mar. 14, 1922 |
| 1,413,579 | Gill | Apr. 25, 1922 |
| 2,040,479 | Glore | May 12, 1936 |
| 2,205,160 | Trackwell | June 18, 1940 |
| 2,358,452 | Garstang | Sept. 19, 1944 |

FOREIGN PATENTS

| Number | Country | Date |
| --- | --- | --- |
| 764,152 | France | May 16, 1934 |